US008646023B2

(12) United States Patent
Khosla

(10) Patent No.: US 8,646,023 B2
(45) Date of Patent: Feb. 4, 2014

(54) AUTHENTICATION AND SYNCHRONOUS INTERACTION BETWEEN A SECONDARY DEVICE AND A MULTI-PERSPECTIVE AUDIOVISUAL DATA STREAM BROADCAST ON A PRIMARY DEVICE GEOSPATIALLY PROXIMATE TO THE SECONDARY DEVICE

(75) Inventor: Vinod Khosla, Portola Valley, CA (US)

(73) Assignee: Dijit Media, Inc., San Francisco, CA (US)

( * ) Notice: Subject to any disclaimer, the term of this patent is extended or adjusted under 35 U.S.C. 154(b) by 66 days.

(21) Appl. No.: 13/344,608

(22) Filed: Jan. 5, 2012

(65) Prior Publication Data

US 2013/0176493 A1 Jul. 11, 2013

(51) Int. Cl.
H04N 7/10 (2006.01)
H04N 7/16 (2011.01)

(52) U.S. Cl.
USPC ............................................. 725/141; 725/34

(58) Field of Classification Search
USPC ........... 348/563–565, 588, 552, 14.01–14.04, 348/837, 838; 725/75, 78–83, 86, 100, 32, 725/34, 35, 131–133, 139–141, 151–153; 455/3.06, 556.1, 556.2; 715/864; 709/203; 463/39–42
See application file for complete search history.

(56) References Cited

U.S. PATENT DOCUMENTS 7,278,154 B2 * 10/2007 Harrison et al. .............. 725/141
7,526,575 B2 * 4/2009 Rabbers et al. ............... 709/248
7,587,214 B2 * 9/2009 Inselberg ...................... 455/517
7,712,125 B2 * 5/2010 Herigstad et al. ............. 725/141
7,966,631 B2 * 6/2011 Megeid ........................... 725/34
8,161,172 B2 * 4/2012 Reisman ....................... 709/228
8,296,332 B2 * 10/2012 Boley et al. ................... 707/803
2002/0149617 A1 * 10/2002 Becker .......................... 345/751
2007/0011701 A1 * 1/2007 Jung et al. ...................... 725/38
2007/0079353 A1 * 4/2007 Boortz .......................... 725/135
2012/0131610 A1 * 5/2012 Fernandez Gutierrez et al. ............................... 725/34

OTHER PUBLICATIONS

International Search Report and Written Opinion received for PCT Patent Application No. PCT/US2013/020394, mailed on Mar. 19, 2013, 6 pages.

* cited by examiner

Primary Examiner — Victor Kostak
(74) Attorney, Agent, or Firm — Morrison & Foerster LLP

(57) ABSTRACT

A method of authentication and synchronous interaction between a secondary device and a multi-perspective audiovisual data stream broadcast on a primary device geospatially proximate to the secondary device is disclosed. In one aspect a method of secondary device includes authenticating the secondary device to a primary device based on a geospatial proximity of the secondary device and the primary device such that the secondary device is synchronizable with the primary device. The secondary device is synchronized to the primary device such that an audiovisual data stream of the primary device is adjustable through the secondary device. An audiovisual data stream of the primary device may be processed such that the audiovisual data stream is accessible through the secondary device. The audiovisual data stream may be an audiovisual data stream of a live performance of an event.

18 Claims, 8 Drawing Sheets

| SECONDARY DEVICE 104 | PERSPECTIVE 602 | MULTI-PERSPECTIVE STATISTIC 204 | ANNOTATION 304 | GEOSPATIAL PROXIMITY 604 | AUTHENTICATION 606 |
|---|---|---|---|---|---|
| FIRST SECONDARY DEVICE $104_1$ | SECOND AUDIO-VISUAL DATA STREAM $108_2$ | SECOND STATISTIC $204_2$ | FIRST ANNOTATION $304_1$ | Y | Y |
| SECOND SECONDARY DEVICE $104_2$ | THIRD AUDIO-VISUAL DATA STREAM $108_3$ | THIRD STATISTIC $204_3$ | SECOND ANNOTATION $304_2$ | Y | Y |
| THIRD SECONDARY DEVICE $104_3$ | FIRST AUDIO-VISUAL DATA STREAM $108_1$ | FIRST STATISTIC $204_1$ | THIRD ANNOTATION $304_3$ | Y | Y |
| • • • • | • • • • | • • • • | • • • • | • • • • | • • • • |

SYNCHRONOUS INTERACTION DATABASE 430

FIGURE 6

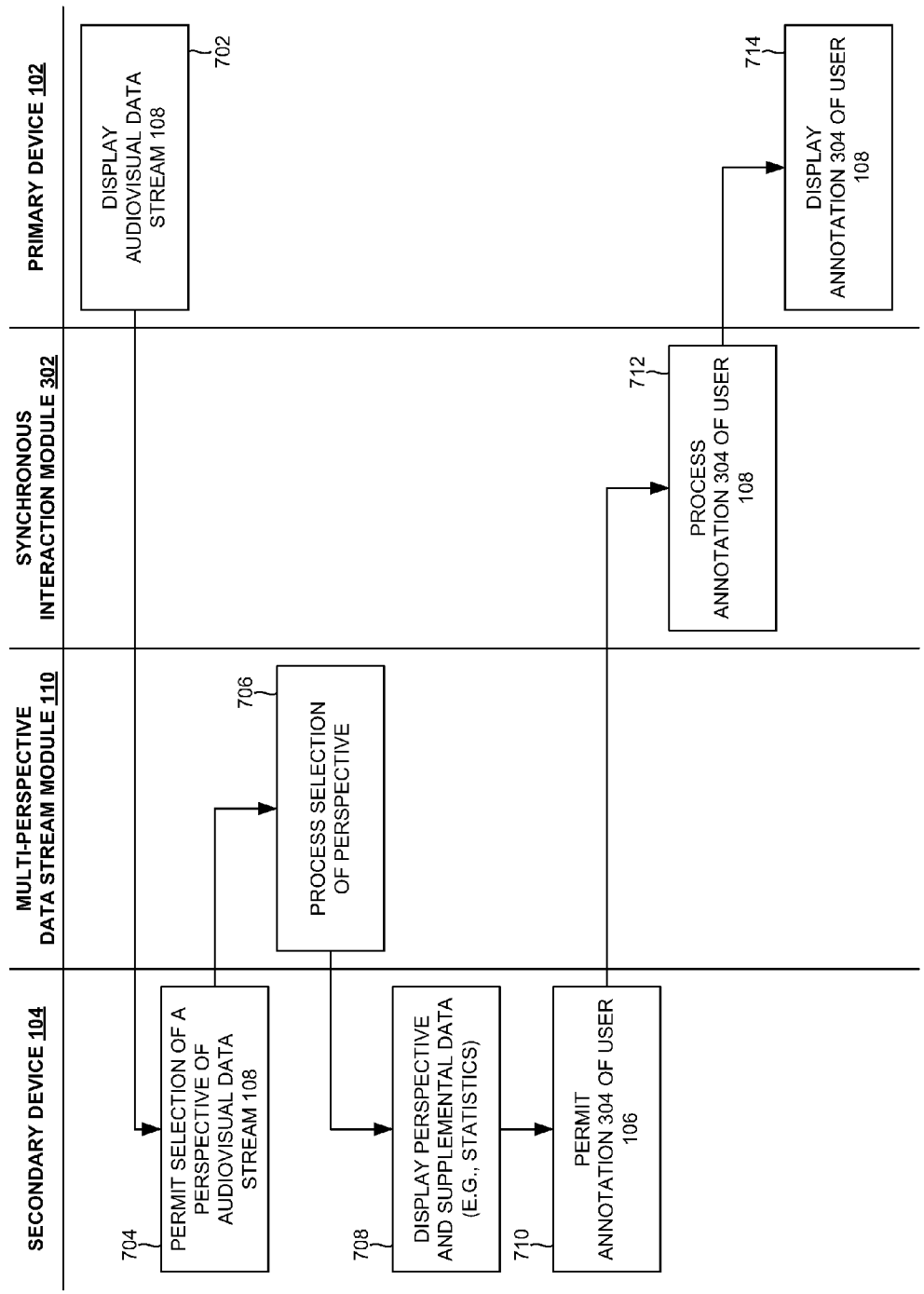

US 8,646,023 B2

AUTHENTICATION AND SYNCHRONOUS INTERACTION BETWEEN A SECONDARY DEVICE AND A MULTI-PERSPECTIVE AUDIOVISUAL DATA STREAM BROADCAST ON A PRIMARY DEVICE GEOSPATIALLY PROXIMATE TO THE SECONDARY DEVICE

FIELD OF TECHNOLOGY

This disclosure relates generally to authentication and synchronous interaction between a secondary device and a multi-perspective audiovisual data stream broadcast on a primary device geospatially proximate to the secondary device.

BACKGROUND

A user may watch an audiovisual data stream through a primary device (e.g., a television, a computer display). A technician (e.g., a broadcast engineer) may control which data captured by different capture devices (e.g., cameras, audio recorders, temperature sensors, measurement detectors, etc.) during live performance of an event (e.g., a sporting event, a gambling competition, a live-action theatre, a speech, a concert) associated with the audiovisual data stream broadcast on the primary device.

The user may prefer to watch data other than the ones selected by the technician. In addition, the user may prefer to communicate with another user through a physical interaction with a tactile interaction with a display area of the primary device. Therefore, an experience by the user watching the audiovisual data stream may be less than satisfactory.

SUMMARY

A method of authentication and synchronous interaction between a secondary device and a multi-perspective audiovisual data stream broadcast on a primary device geospatially proximate to the secondary device is disclosed. In one aspect a method of secondary device includes authenticating the secondary device to a primary device based on a geospatial proximity of the secondary device and the primary device such that the secondary device is synchronizable with the primary device. The secondary device is synchronized to the primary device such that an audiovisual data stream of the primary device is adjustable through the secondary device. An audiovisual data stream of the primary device may be processed such that the audiovisual data stream is accessible through the secondary device. The audiovisual data stream may be an audiovisual data stream of a live performance of an event.

Another audiovisual data stream of the primary device may be processed such that another audiovisual data stream is accessible through the secondary device. The another audiovisual data stream may be a different perspective of the audiovisual data stream. The different perspective of the audiovisual data stream a different camera angle feed and/or a different sound feed of the live performance of the event. A selection of the audiovisual data stream or the another audiovisual data stream based on a preference of a user may be permitted through the secondary device such that the selection is rendered in the primary device.

A supplemental data of the audiovisual data stream based on the selection may be processed such that the supplemental data may rendered in the secondary device. The supplemental data may be a statistic based on the live performance of the event and an advertisement based on the live performance of the event.

An annotation of the user of the secondary device may be permitted through a tactile interaction through a display area of the secondary device such that the annotation is rendered in the primary device. The annotation of the secondary device may be processed such that the annotation is rendered in the primary device.

The method of the secondary device may further include determining an availability of another secondary device based on the geospatial proximity of the secondary device and the another secondary device such that the secondary device is synchronizable with the another secondary device. The annotation of the user of the secondary device may be permitted such that the annotation is rendered in the another secondary device. The annotation of the user of the secondary device may be processed such that the annotation is rendered in the another secondary device.

The method of the secondary device may further include permitting a wager between the user of the secondary device and the user of the another secondary device based on a broadcast of the live performance of the event of the primary device. The wager may be processed such that the a monetary unit is transferrable between an account of the user of the secondary device and the account of the user of the another secondary device based on an outcome of the live performance of the event of the primary device.

In another aspect a method of a primary device includes authenticating the secondary device to the primary device based on a geospatial proximity of the secondary device and the primary device such that the secondary device is synchronizable with the primary device. An audiovisual data stream may be processed such that the audiovisual data stream is rendered in the primary device. Another audiovisual data stream through the primary device may be processed such that the another audiovisual data stream is accessible through the secondary device.

A selection of one of the audiovisual data stream and the another audiovisual data stream based on a preference of a user through the secondary device may be processed such that the selection is rendered in the primary device. A supplemental data of the audiovisual data stream based on the selection may be analyzed such that the supplemental data is rendered in the primary device. An annotation of the user of the secondary device may be analyzed such that the annotation is rendered in the primary device. An annotation of the user of the secondary device may be displayed through the primary device.

In yet another aspect, the method may include authenticating a secondary device and another secondary device to a primary device based on a geospatial proximity of the secondary device and the another secondary device to the primary device such that the secondary device and the another secondary device is synchronizable with the primary device. The secondary device and the another secondary device may be synchronized to the primary device such that an audiovisual data stream of the primary device is adjustable through the secondary device and the another secondary device. An audiovisual data stream of the primary device may be processed such that the is accessible to the secondary device and the another secondary device.

An annotation based on the audiovisual data stream may be permitted through the secondary device such that the annotation is rendered in the primary device and the another secondary device. The annotation of the secondary device may be processed such that the annotation is rendered in the primary device and the another secondary device. A communication based on the audiovisual data stream may be facilitated between a user of the secondary device and the user of the another secondary device through a display of the annotation through the another secondary device and the primary device.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 6 is a database view of the synchronous interaction database comprising preferences of a user based on the audiovisual data stream, according to one embodiment.

FIG. 7 is a flow diagram of a communication between the secondary device and the primary device based on the audiovisual data stream, according to one embodiment.

Other features of the present embodiments will be apparent from the accompanying drawings and from the detailed description that follows.

DETAILED DESCRIPTION

Methods of authentication and synchronous interaction between a secondary device and a multi-perspective audiovisual data stream broadcast on a primary device geospatially proximate to the secondary device are disclosed. In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments.

Figure 1:
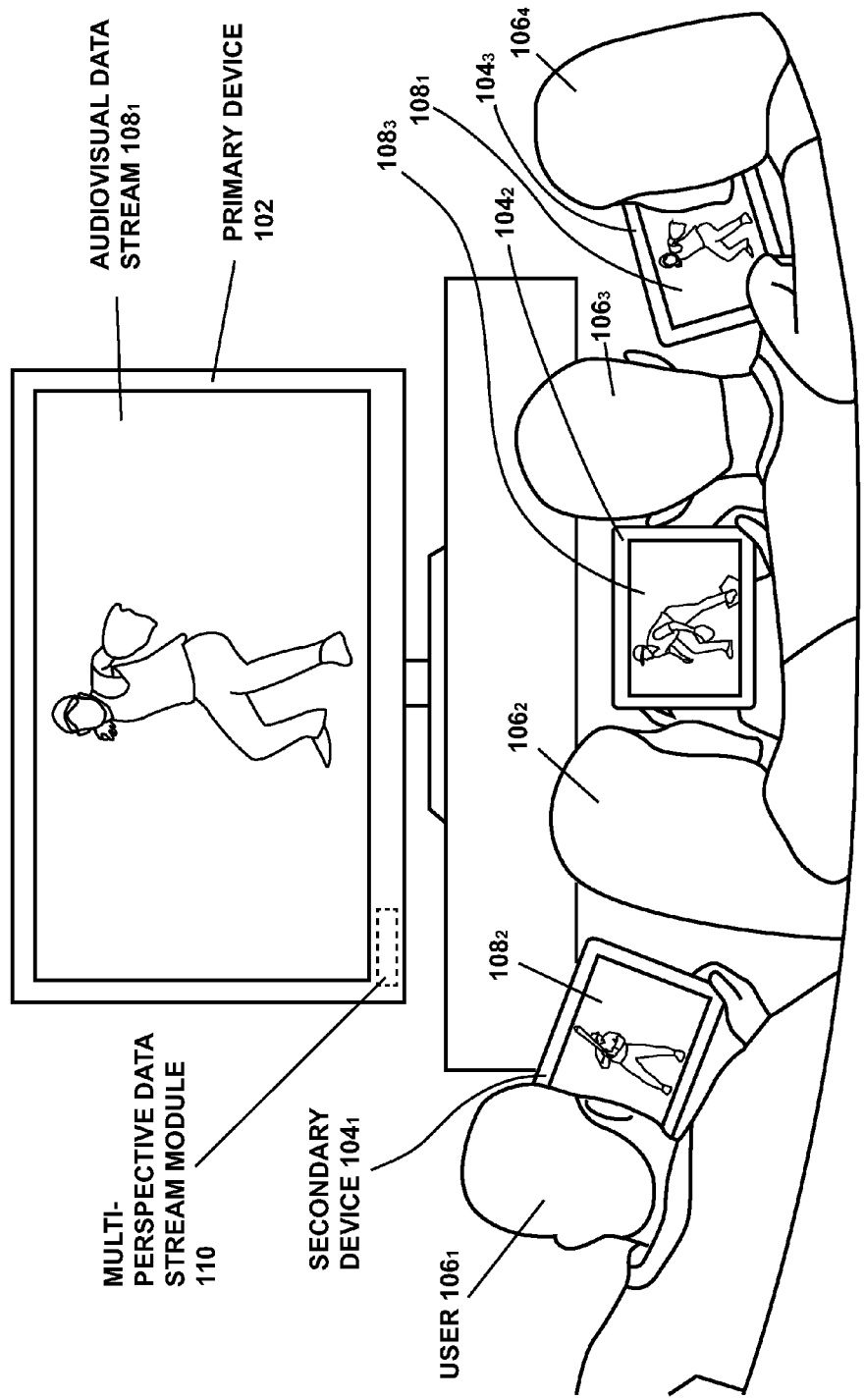
FIG. 1 is an illustrative view of several users watching a different perspective of an audiovisual data stream of a primary device through secondary devices, according to one embodiment.

FIG. 1 is an illustrative view of several users 106 watching a different perspective of an audiovisual data stream 108 of a primary device 102 through secondary devices 104. The primary device 102 may be a television, a computer, a projector, and/or another device that displays an audiovisual data stream 108. An audiovisual data stream may be an electronic medium comprising a sound component and a visual component. An audiovisual data stream may include a television program, a movie, and/or a broadcast of a live performance of an event (e.g., a sporting event, a gambling competition, a live-action theatre, a speech, and/or a concert).

Users 106 may watch and/or listen to the audiovisual data stream 108 through the primary device 102. In addition, users 106 may bring a secondary device 104 when they are watching the audiovisual data stream 108 of the primary device 102. The secondary device 104 may include a display area with a touch receptive area such that a user 106 may physically interact with the secondary device 104 through a tactile interaction through the display are of the secondary device 104 (e.g., tablet computer). The secondary device 104 may display the audiovisual data stream $108_1$ of the primary device 102 and/or another audiovisual data stream $108_2$. The another audiovisual data stream $108_2$ may be a different perspective (e.g., different camera angle) of the audiovisual data stream $108_1$.

In one embodiment, the multi-perspective data stream module 110 may authenticate the secondary device 104 to a primary device 102 based on a geospatial proximity of the secondary device and the primary device such that the secondary device 104 is synchronizable with the primary device 102. The secondary device 104 may be synchronized to the primary device 102 such that an audiovisual data stream $108_1$ of the primary device 102 is adjustable through the secondary device 104. An audiovisual data stream $108_1$ of the primary device 102 may be processed such that the audiovisual data stream $108_1$ is accessible through the secondary device.

Another audiovisual data stream $108_2$ of the primary device 102 may be processed such that the another audiovisual data stream $108_2$ is accessible through the secondary device, wherein the another audiovisual data stream $108_2$ is a different perspective of the audiovisual data stream $108_1$. A selection of one of the audiovisual data stream $108_1$ and the another audiovisual data stream $108_2$ based on a preference of a user 106 may be permitted through the secondary device 104 such that the selection is rendered in the primary device 102 and/or the secondary device 104.

In an example embodiment based on FIG. 1, a group of friends (e.g., users $106_1$, $106_2$, $106_3$, and $106_4$) may be gathered in a living room to watch a baseball game on a television screen. Each user may have a tablet computer and that tablet computer may access the baseball game, because the user is within a geospatial proximity of the television screen (e.g., in the same room). The user may select which perspective of the game is on the television screen and/or tablet computer. For example, the television screen may be showing the pitcher pitching while the tablet may be showing the batter preparing to hit the ball.

Figure 2:
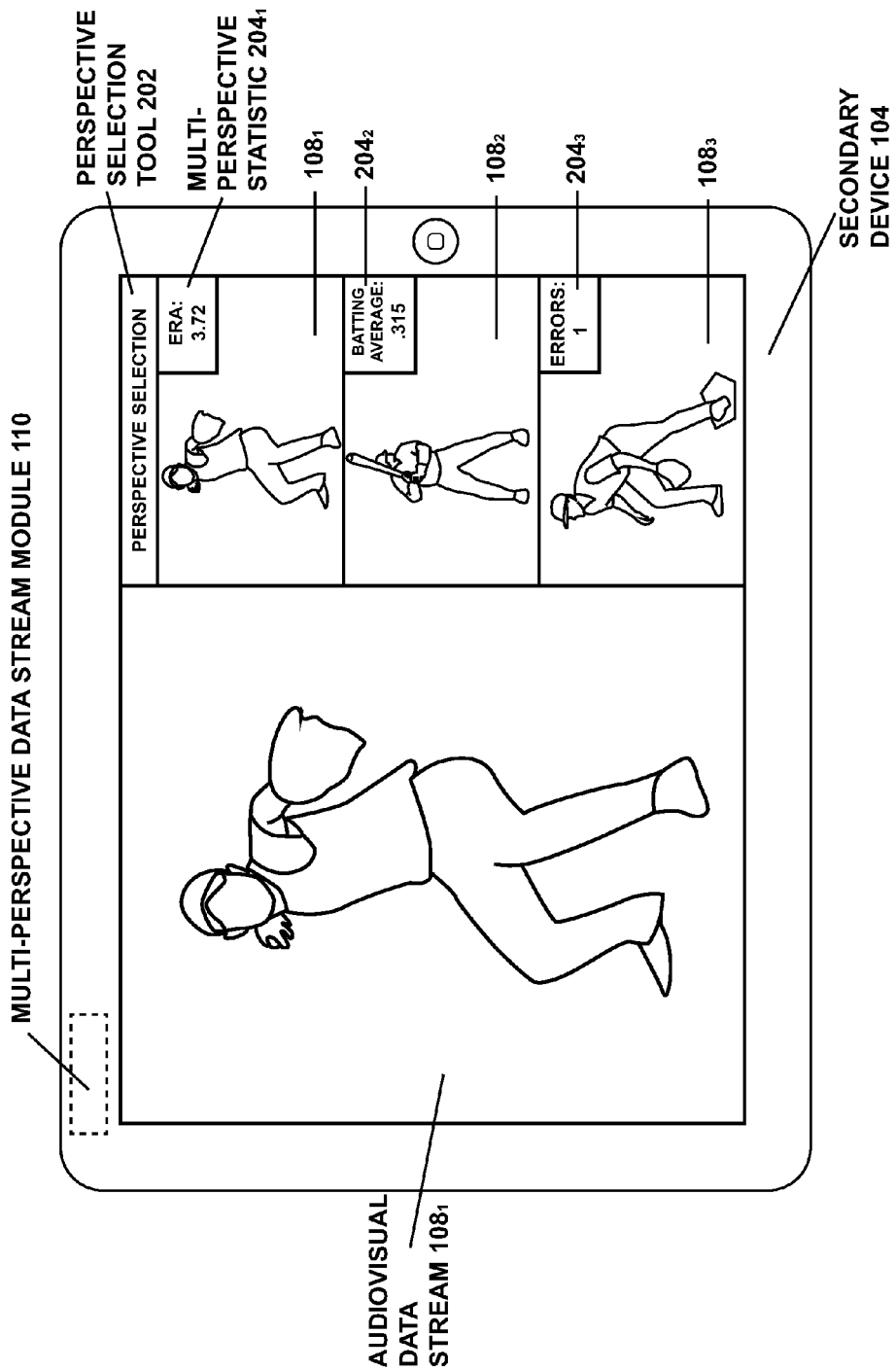
FIG. 2 is an illustrative view of a secondary device displaying at least one audiovisual data stream, according to one embodiment.

FIG. 2 is an illustrative view of a secondary device 104 displaying at least one audiovisual data stream 108. In one embodiment, the secondary device 104 may display the audiovisual data stream $108_1$ (e.g., a pitcher pitching). In another embodiment, the secondary device 104 may display another audiovisual data stream $108_2$ (e.g., a batter batting) and/or yet another audiovisual data stream $108_3$ (e.g., the first baseman fielding) simultaneously with the audiovisual data stream $108_1$.

In one embodiment, the multi-perspective data stream module 110 of the secondary device 104 may permit a user 106 to select a perspective (e.g., camera angle) of the broadcast through a perspective selection tool 202. For example, the user 106 watching a baseball game may select to watch either the pitcher, the batter, and/or the fielder though a selection on the secondary device 104. In another embodiment, the multi-perspective data stream module may process supplemental data (e.g., multi-perspective statistic 204) based on the audiovisual data stream 108. For example, the secondary device may display a pitcher's earned run average (ERA) during the audiovisual data stream of a pitcher. Likewise, a batter's batting average may be displayed if the camera angle perspective is that of the batter. The number of errors by a fielder may be displayed if the camera angle perspective is that of a fielder.

Figure 3:
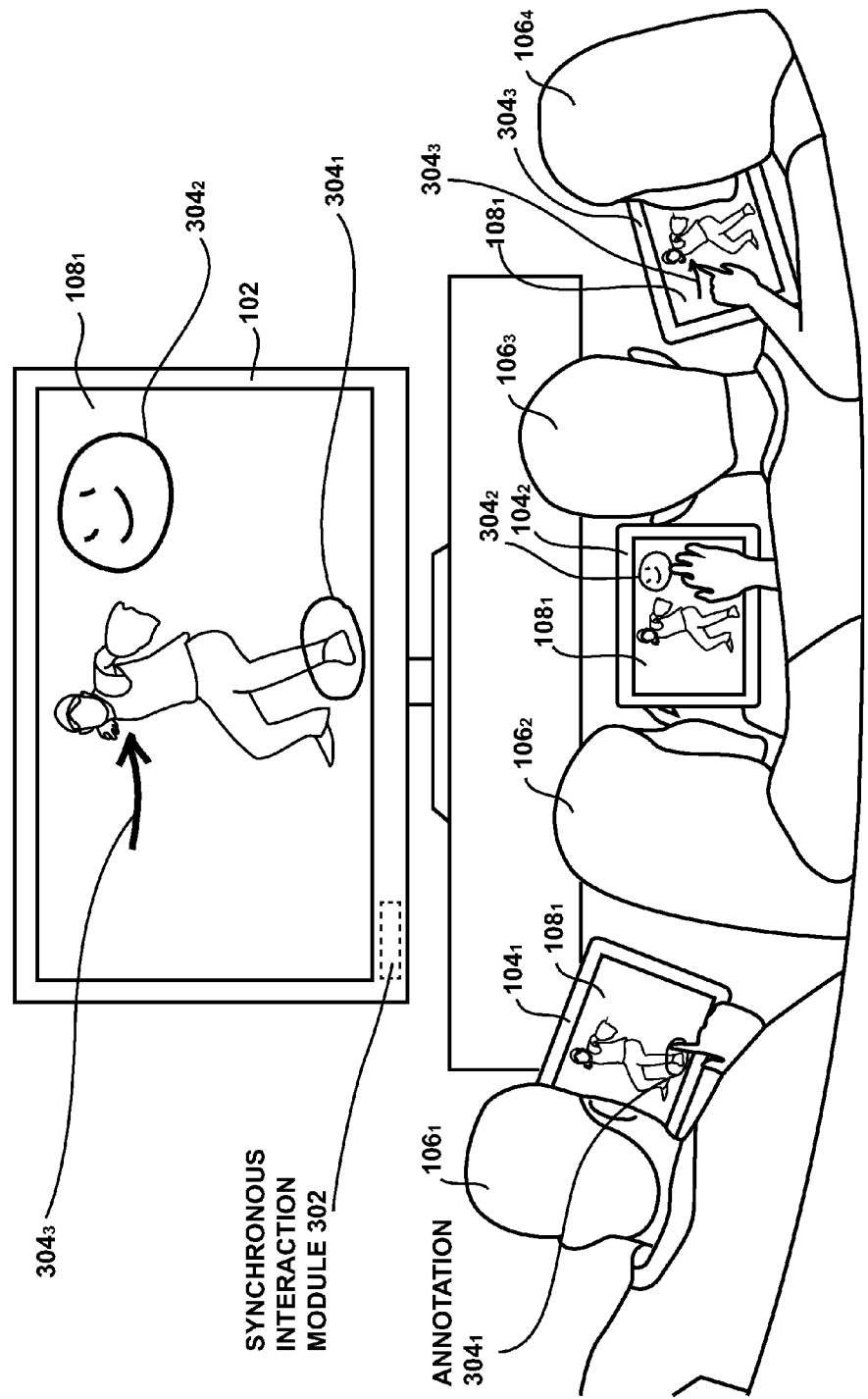
FIG. 3 is an illustrative view of several users creating an annotation based on the audiovisual data stream of a primary device through secondary devices, according to one embodiment.

FIG. 3 is an illustrative view of several users 106 creating an annotation 304 based on the audiovisual data stream 108 of a primary device 102 through secondary devices 104. The annotation may be a visual representation of a comment of user 106 of the secondary device 104 based on the audiovisual data stream 108. The annotation 304 may be creatable through a tactile interaction through a display area of the secondary device 104.

In one embodiment, the synchronous interaction module 302 may permit an annotation of the user 106 of the secondary device 104 through a tactile interaction through a display area of the secondary device 104 such that the annotation is rendered in the primary device 102. The annotation 304 of the secondary device 104 may be processed such that the annotation 304 is rendered in the primary device 102.

In another embodiment, the synchronous interaction module 302 may permit the annotation 304 of the user 106 of the secondary device 104 such that the annotation 304 is rendered in the another secondary device 104. The annotation of the user 106 of the secondary device 104 such that the annotation 304 is rendered in the another secondary device 104. The user 106 may create the annotation 304 such that the annotation 304 is visible through the primary device at the time of the creation of the annotation 304.

In an example embodiment based on FIG. 3, a user watching a baseball game may express a particular point through an annotation. For example, user $106_1$ may create an annotation $304_1$ to show that the pitcher is using proper technique in the placement of his foot. User $106_4$ may create annotation $304_3$ to point at the pitchers grip on the ball. User $106_2$ may create annotation $304_2$ to express contentment with the performance of the pitcher.

Figure 4:
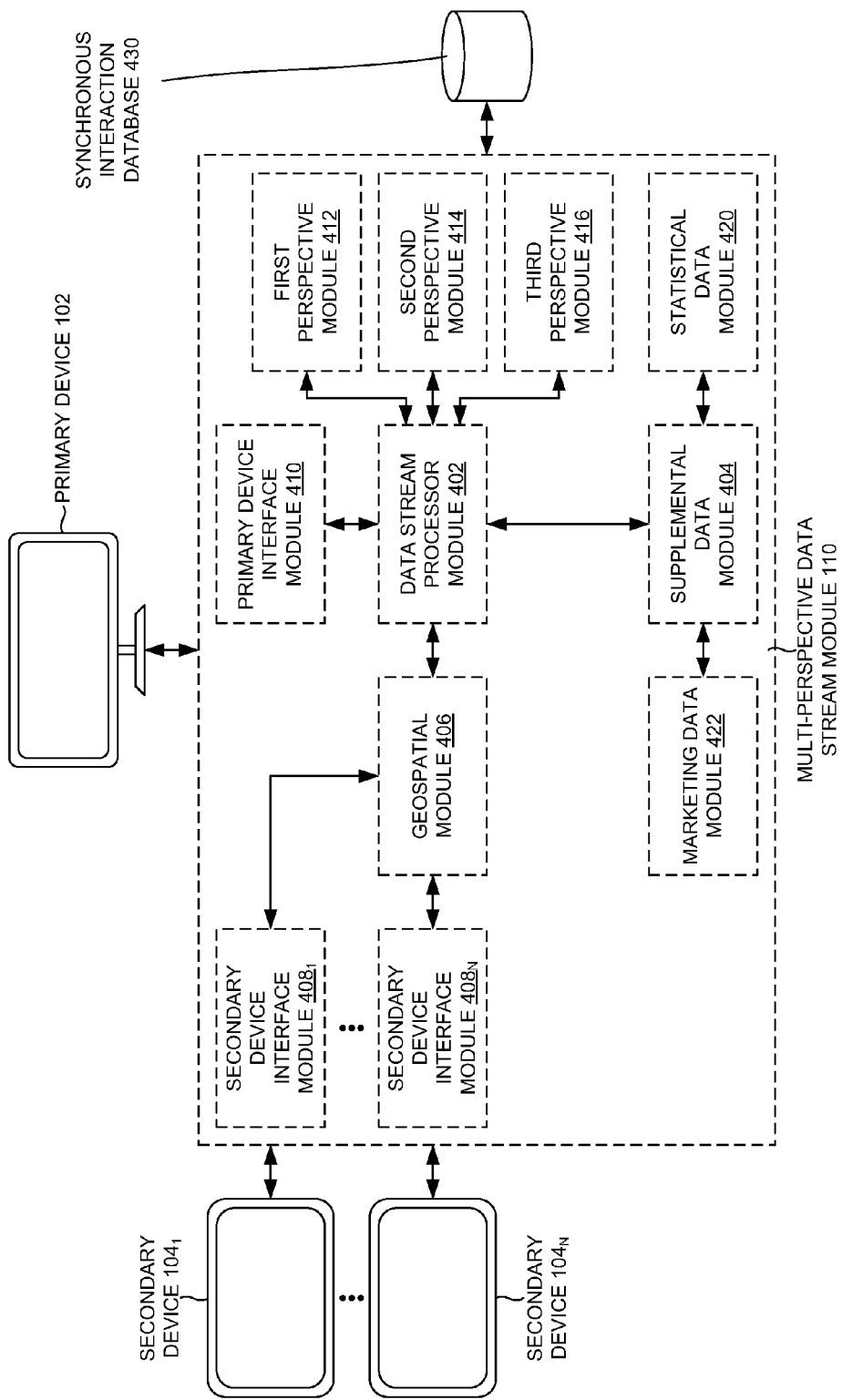
FIG. 4 is a block diagram of the multi-perspective data stream module, according to one embodiment.

FIG. 4 is a block diagram of the multi-perspective data stream module 110. The multi-perspective data stream module 110 may communicate with the primary device 102, the secondary device 104, and/or the synchronous interaction database 430. The multi-perspective data stream module 110 may comprise a secondary device interface module 408, a geospatial module 406, a primary device interface module 410, a data stream processor module 402, a supplemental data module 404, a marketing data module 422, a statistical data module 420, a first perspective module 412, a second perspective module 414, and/or a third perspective module 416.

In one embodiment, the secondary device module 408 may process a request of the secondary device to adjust the audiovisual data stream of the primary device. In an example embodiment, the user 106 may adjust the audiovisual data stream of the primary device through a selection of a particular camera angle. The secondary device modules $408_{1-N}$ may process requests from one or more secondary devices $104_{1-N}$. The geospatial module 406 may determine the availability of the secondary device $104_1$ and/or the another secondary device $104_2$ based on a geospatial proximity of the secondary device $104_1$ and/or the another secondary device $104_2$ to the primary device 102. For example if the secondary device 104 is not within a predetermined radius of the primary device 102, the secondary device 104 may be prevented from accessing the audiovisual data stream 108 of the primary device 102.

The primary device interface module 410 may permit the secondary device 104 to access the audiovisual data stream 108 of the primary device 102. The data stream processor module 402 may process the audiovisual data stream 108 such that the user 106 may select a particular perspective of the audiovisual data stream 108. The first perspective module 412, the second perspective module 414, and the third perspective module 416 may process each of the different camera angles of the audiovisual data stream 108.

The supplemental data module 404 may provide additional data (e.g., directed advertising and/or statistics) based on the audiovisual data stream 108. The statistical data module 420 may provide statistics based on the audiovisual data stream 108. For example, if the user 106 is watching a sporting event, the statistical data module 420 may provide statistics about the teams and/or individual players. The marketing data module 422 may provide directed advertising based on the audiovisual data stream 108. For example, if the user 106 is watching a sporting event, the marketing data module 422 may provide directed advertising related to sports (e.g., beer and/or pizza).

Figure 5:
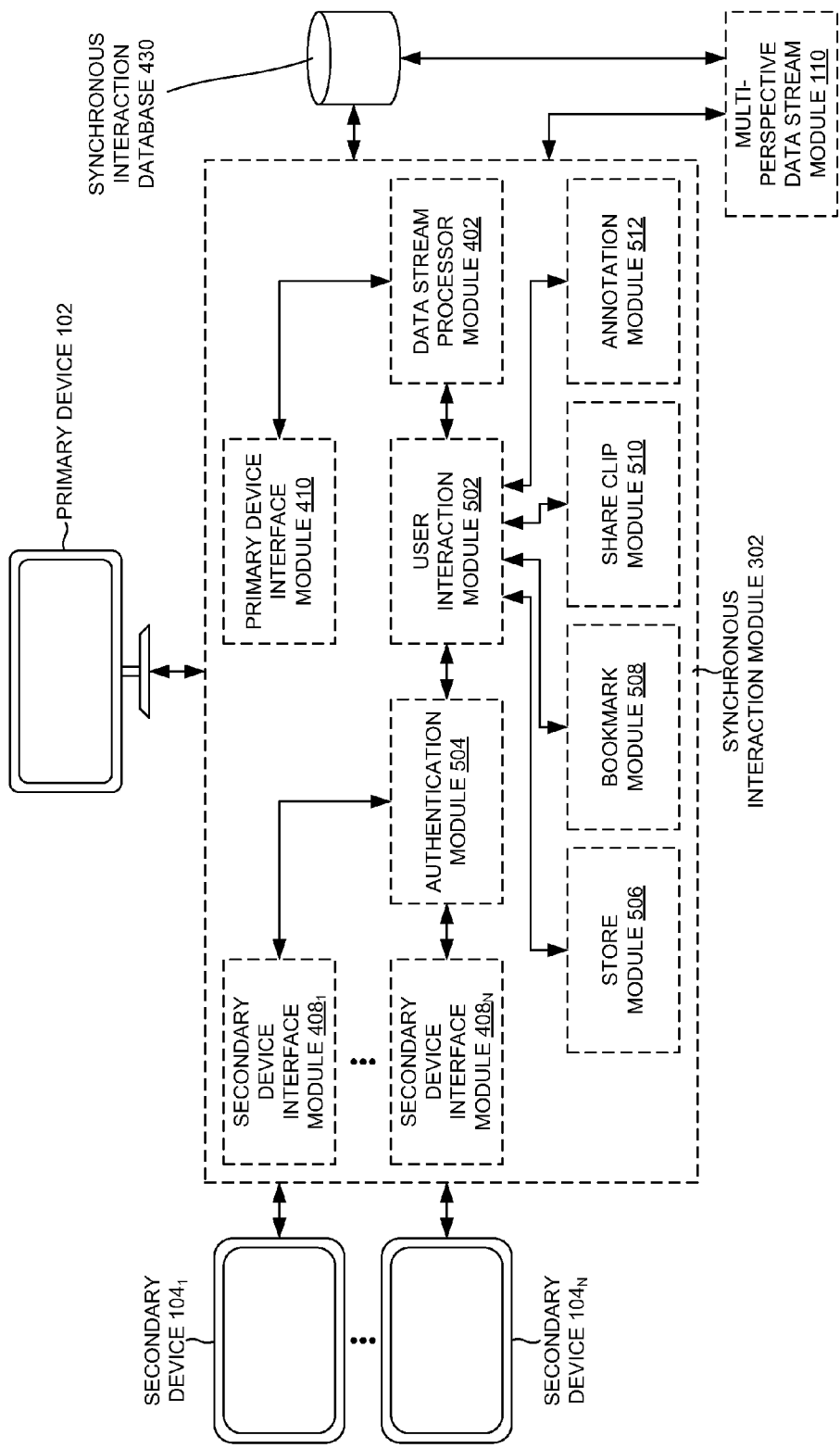
FIG. 5 is a block diagram of the synchronous interaction module, according to one embodiment.

FIG. 5 is a block diagram of the synchronous interaction module 302. The synchronous interaction module 302 may communicate with the primary device 102, the secondary device 104, the multi-perspective data stream module 110, and/or the synchronous interaction database 430. The synchronous interaction module 302 may comprise a secondary device interface module 408, a primary device interface module 410, an authentication module 504, a user interaction module 502, a data stream processor module 402, a store module 506, a bookmark module 508, share clip module 510, and/or an annotation module 512.

In one embodiment, the secondary device interface module may process an annotation 304 of the secondary device 104. The authentication module 504 may authenticate one or more secondary devices 104 such that the secondary device 104 may be permitted to communicate with the primary device 102 and/or another secondary device 104. The user interaction module 502 may process a request of a user 106 to communicate with the primary device 102 and/or another secondary device 104. The data stream processor module 402 may process the annotation 304 such that the annotation 304 is visible through the audiovisual data stream 108.

The annotation module 512 may process an annotation 304 of the user 106 of the secondary device 104 such that the annotation is visible through the primary device 102 and/or another secondary device. The share clip module 510 may process a request of the user 106 to share a short segment of the audiovisual data stream 108 (e.g., highlight) with another user 106. The bookmark module 508 may process a request of a user 106 to mark a particular point in time of the audiovisual data stream 108. The store module 508 may process a request of the user 106 to store all or part of the audiovisual data stream 108.

FIG. 6 is a database view of the synchronous interaction database 430 comprising preferences of a user 106 based on the audiovisual data stream 108. The synchronous interaction database 430 may comprise fields of secondary device 104, perspective 602, multi-perspective statistic 204, annotation 304, geospatial proximity 604, and authentication 606.

The field of the secondary device 104 may contain data about a secondary device 104 permitted to access the primary device 102. The field of perspective 602 may contain data regarding the perspective (e.g., camera angle) chosen by the user 106 of the secondary device 104. The field of the multi-perspective statistic 204 may contain statistics based on the perspective of the audiovisual data stream 108. The field of annotation 304 may contain the annotation 304 created by the user 106 of the secondary device 104. The field of geospatial proximity 604 may contain information as to whether the secondary device 104 is within a predetermined radius of the primary device 102. The field of authentication 606 may contain information as to whether the secondary device 104 is authenticated to the primary device.

FIG. 7 is a flow diagram of a communication between the secondary device 104 and the primary device 102 based on the audiovisual data stream 108. In operation 702, the primary device 102 displays the audiovisual data stream 108. In operation 704, the user 106 may select a perspective (e.g., camera angle) of the audiovisual data stream 108 through the secondary device 104. In operation 706, the selection of the perspective of the user 106 may be processed through the multi-perspective data stream module 110. In operation 708, the selected perspective and/or any supplemental data (e.g., statistics and/or directed advertising) may be displayed through the secondary device 104.

In operation 710, the secondary device 104 may permit a user 106 to create an annotation 304 based on the audiovisual data stream 108 through a tactile interaction of the display area of the secondary device 104. In operation 712, the synchronous interaction module 302 may process the annotation 304 such that the annotation is rendered in another secondary device 104 and/or the primary device 102. In operation 714, the primary device 102 may display the annotation 304 of the user 106.

Figure 8:
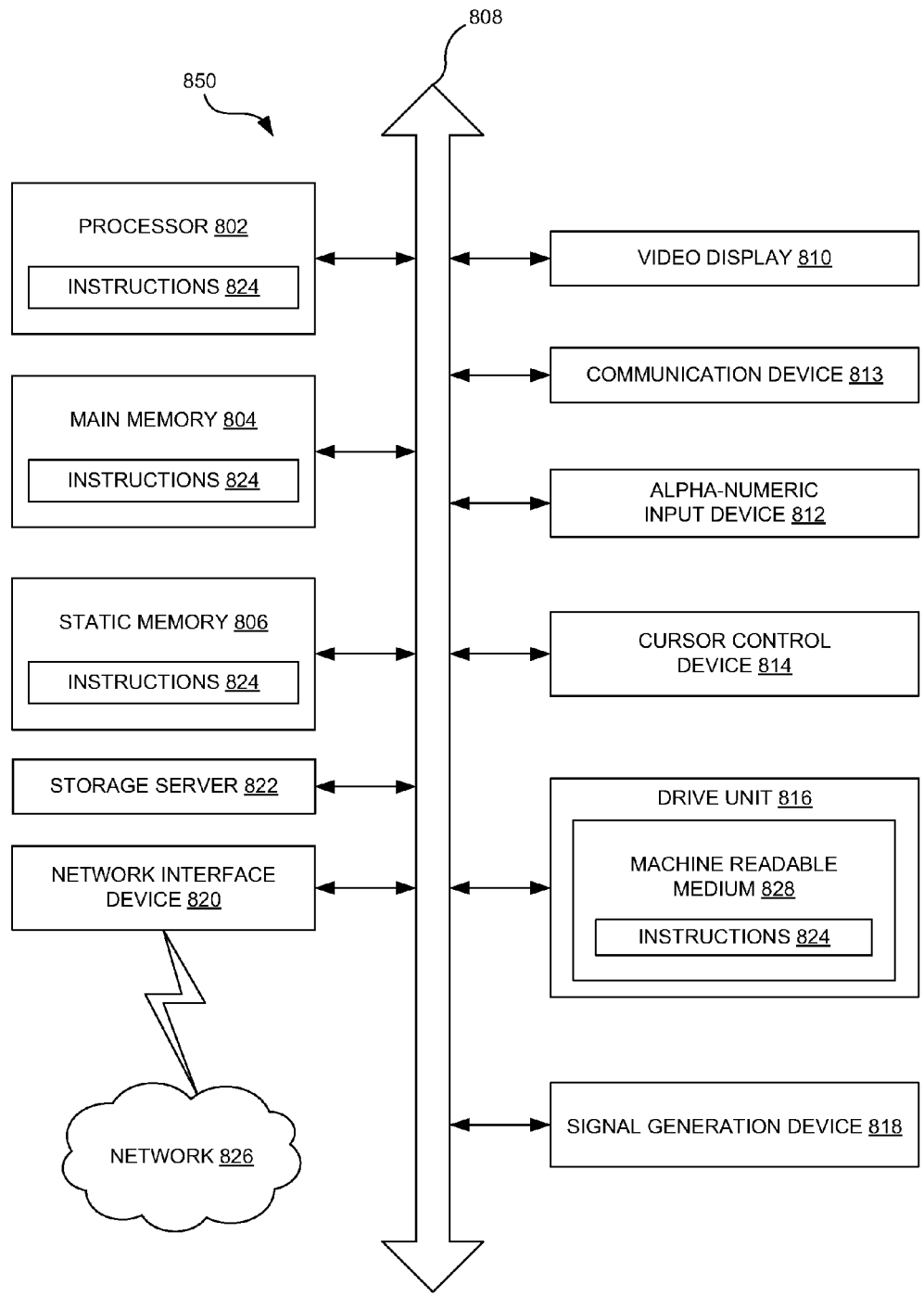
FIG. 8 is a diagrammatic view of a data processing system in which any of the embodiments disclosed herein may be performed, according to one embodiment.

FIG. 8 may indicate a tablet computer and/or the data processing system 850 in which one or more operations disclosed herein may be performed. The processor 802 may be a microprocessor, a state machine, an application specific integrated circuit, a field programmable gate array, etc. (e.g., Intel® Pentium® processor, 620 MHz ARM 1176, etc.). The main memory 804 may be a dynamic random access memory and/or a primary memory of a computer system.

The static memory 806 may be a hard drive, a flash drive, and/or other memory information associated with the data processing system. The bus 808 may be an interconnection between various circuits and/or structures of the data processing system. The video display 810 may provide graphical representation of information on the data processing system. The alpha-numeric input device 812 may be a keypad, a keyboard, a virtual keypad of a touchscreen and/or any other input device of text (e.g., a special device to aid the physically handicapped).

The cursor control device 814 may be a pointing device such as a mouse. The signal generation device 818 may be a BIOS and/or a functional operating system of the data processing system. The network interface device 820 may be a device that performs interface functions such as code conversion, protocol conversion and/or buffering required for communication to and from the network 826. The machine readable medium 828 may be within a drive unit 816 and may provide instructions on which any of the methods disclosed herein may be performed. The communication device 813 may communicate with the user 106 of the data processing system 850. The storage server 822 may store data. The instructions 824 may provide source code and/or data code to the processor 802 to enable any one or more operations disclosed herein.

In an example situation incorporating the disclosure, a group of friends may be gathered in a living room watching a sporting event (or any other live broadcast) on the television screen in the living room. Each person may have a tablet computer. The user may be able to watch the sporting event on the tablet computer and/or select a different perspective (e.g., camera angle) to watch on the television screen though the tablet computer. Additionally, the user of the tablet computer may be able to communicate with the other friends in the room with annotations that are drawn on the tablet computer that the visible on the television screen and/or on other tablet computers.

The modules of the figures may be enabled using software and/or using transistors, logic gates, and electrical circuits (e.g., application specific integrated ASIC circuitry) such as a security circuit, a recognition circuit, a tactile pattern circuit, an association circuit, a store circuit, a transform circuit, an initial state circuit, an unlock circuit, a deny circuit, a determination circuit, a permit circuit, a user circuit, a region circuit, and other circuits.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a primary device comprising;
authenticating a secondary device to the primary device based on a geospatial proximity of the secondary device and the primary device such that the secondary device is synchronizable with the primary device;
processing an audiovisual data stream such that the audiovisual data stream is rendered in the primary device;
processing another audiovisual data stream through the primary device such that the another audiovisual data stream is accessible through the secondary device, wherein the another audiovisual data stream is a different perspective of the audiovisual data stream;
processing a selection of one of the audiovisual data stream and the another audiovisual data stream based on a preference of a user through the secondary device such that the selection is rendered in the primary device;
analyzing a supplemental data of the audiovisual data stream based on the selection such that the supplemental data is rendered in the primary device;
analyzing an annotation of the user of the secondary device such that the annotation is rendered in the primary device; and
displaying the annotation of the user of the secondary device through the primary device.

2. The method of claim 1 further comprising;
determining an availability of another secondary device based on the geospatial proximity of the primary device and the another secondary device such that the primary device is synchronizable with the another secondary device.

3. The method of claim 2 further comprising;
processing the annotation of the user of the another secondary device such that the annotation is rendered in the primary device.

4. The method of claim 3 wherein the audiovisual data stream is the audiovisual data stream of a live performance of an event.

5. The method of claim 4 wherein the supplemental data is one of a statistic based on the live performance of the event and an advertisement based on the live performance of the event.

6. The method of claim 5 further comprising;
permitting a wager between the user of the secondary device and the user of the another secondary device based on a broadcast of the live performance of the event of the primary device; and
processing the wager such that the a monetary unit is transferrable between an account of the user of the secondary device and the account of the user of the another secondary device based on an outcome of the live performance of the event of the primary device.

7. The method of claim 6 wherein the different perspective of the audiovisual data stream is one of a different camera angle feed and a different sound feed of the live performance of the event.

8. A method comprising:
authenticating a secondary device and another secondary device to a primary device based on a geospatial proximity of the secondary device and the another secondary device to the primary device such that the secondary device and the another secondary device is synchronizable with primary device;
synchronizing the secondary device and the another secondary device to the primary device such that an audiovisual data stream of the primary device is adjustable through the secondary device and the another secondary device;
processing the audiovisual data stream of the primary device such that the is accessible to the secondary device and the another secondary device;
permitting an annotation based on the audiovisual data stream through the secondary device such that the annotation is rendered in the primary device and the another secondary device;
processing the annotation of the secondary device such that the annotation is rendered in the primary device and the another secondary device; and
facilitating a communication based on the audiovisual data stream between a user of the secondary device and the user of the another secondary device through a display of the annotation through the another secondary device and the primary device.

9. The method of claim 8 wherein the audiovisual data stream is the audiovisual data stream of a live performance of an event.

10. The method of claim 9 further comprising;
permitting a wager between the user of the secondary device and the user of the another secondary device based on a broadcast of the live performance of the event of the primary device; and
processing the wager such that the a monetary unit is transferrable between an account of the user of the secondary device and the account of the user of the another secondary device based on an outcome of the live performance of the event of the primary device.

11. The method of claim 8 wherein the annotation is a visual representation of a comment of the user of the secondary device based on the audiovisual data stream.

12. The method of claim 11 wherein the annotation is creatable through a tactile interaction through a display area of the secondary device.

13. A television device, wherein the television device is a primary device, the television comprising:
one or more computer processors;
a memory operatively coupled with one or more computer processors; and
a network interface operatively coupled to the one or more computer processors and configured to receive an audiovisual data stream,
wherein the one or more processors are configured to:
authenticate a secondary device to the primary device based on a geospatial proximity of the secondary device and the primary device such that the secondary device is synchronizable with the primary device;
process the audiovisual data stream and cause a rendering of the audiovisual data stream on a display screen;
process another audiovisual data stream through the primary device such that the another audiovisual data stream is accessible through the secondary device, wherein the another audiovisual data stream is a different perspective of the audiovisual data stream;
process a selection of one of the audiovisual data stream and the another audiovisual data stream based on a preference of a user through the secondary device such that the selection is rendered on the display screen;
analyze a supplemental data of the audiovisual data stream based on the selection and cause a rendering of the supplemental data on the display screen;
analyze an annotation of the user of the secondary device and cause a rendering of the annotation on the display screen; and
cause a display of the annotation of the user of the secondary device.

14. The television device of claim 13, wherein the television device is a television set-top box configured to couple with a television or a projector.

15. The television device of claim 13,
wherein the television device is a television and
wherein the display screen is the television screen.

16. A television device, wherein the television device is a primary device, the television comprising:
one or more computer processors;
a memory operatively coupled with one or more computer processors; and
a network interface operatively coupled to the one or more computer processors and configured to receive an audiovisual data stream,
wherein the one or more processors are configured to:
authenticate a secondary device and another secondary device to the primary device based on a geospatial proximity of the secondary device and the another secondary device to the primary device such that the secondary device and the another secondary device is synchronizable with primary device;
synchronize the secondary device and the another secondary device to the primary device such that the audiovisual data stream of the primary device is adjustable through the secondary device and the another secondary device;
process the audiovisual data stream of the primary device such that the is accessible to the secondary device and the another secondary device;

permit an annotation based on the audiovisual data stream through the secondary device such that the annotation is rendered in a display screen operatively coupled to the primary device and the another secondary device;

process the annotation of the secondary device such that the annotation is rendered in the display screen and the another secondary device; and facilitate a communication based on the audiovisual data stream between a user of the secondary device and the user of the another secondary device through a display of the annotation through the another secondary device and the display screen.

17. The television device of claim 16, wherein the television device is a television set-top box configured to couple with a television or a projector.

18. The television device of claim 16,
wherein the television device is a television and
wherein the display screen is the display screen of the television.

* * * * *